United States Patent [19]

Linne

[11] 4,269,802
[45] May 26, 1981

[54] PROCESS FOR MAKING DUAL-MATERIAL SELF-BONDING LIP SEAL

[75] Inventor: Terry D. Linne, Peoria, Ill.

[73] Assignee: Caterpillar Tractor Co., Peoria, Ill.

[21] Appl. No.: 824,144

[22] Filed: Aug. 12, 1977

Related U.S. Application Data

[62] Division of Ser. No. 667,769, Mar. 17, 1976, Pat. No. 4,066,269.

[51] Int. Cl.³ .......................... B29D 9/00; B29F 1/00
[52] U.S. Cl. .................................. 264/255; 264/267; 264/328.1
[58] Field of Search ............... 264/250, 255, 271, 259, 264/328, 329, 336, 328.1, 267; 277/DIG. 6, 8, 92, 152, 153, 165, 227, 228, 331, 237, 228; 425/DIG. 47, 161

[56] References Cited

U.S. PATENT DOCUMENTS

| | | | |
|---|---|---|---|
| 2,899,402 | 8/1959 | Squire | 264/347 |
| 2,950,266 | 8/1960 | Goldblum | 428/412 |
| 2,976,543 | 3/1961 | Turner et al. | 277/227 |
| 3,069,287 | 12/1962 | Hudson | 428/412 |
| 3,144,153 | 8/1964 | Fuller et al. | 277/227 |
| 3,167,323 | 1/1965 | Appleton | 277/205 |
| 3,271,038 | 9/1966 | Bastow | 277/227 |
| 3,413,183 | 11/1968 | Findlay et al. | 428/412 |
| 3,413,389 | 11/1968 | Footner | 428/156 |
| 3,428,725 | 2/1969 | Delmonte et al. | 264/336 |
| 3,443,845 | 5/1969 | Walchle et al. | 277/227 |
| 3,469,854 | 9/1969 | Linwood | 277/227 |
| 3,528,669 | 9/1970 | Tondato | 277/237 |
| 3,552,755 | 1/1971 | Leonard | 277/237 |
| 3,622,427 | 4/1970 | Kelly | 277/DIG. 6 |
| 3,657,057 | 4/1972 | Shorr et al. | 428/412 |
| 3,709,507 | 1/1973 | Underwood | 277/188 R |
| 3,765,690 | 10/1973 | Sievenpiper | 277/177 |
| 3,771,801 | 11/1973 | Burke | 277/188 |
| 3,822,107 | 7/1974 | Wogerer | 264/245 |
| 3,823,577 | 7/1974 | Smith | 428/412 |
| 3,837,660 | 9/1974 | Poggio | 277/153 |
| 3,919,448 | 11/1975 | Dufresne | 428/157 |
| 3,957,278 | 5/1976 | Rabe | 277/227 |
| 3,995,868 | 12/1976 | Smith | 277/DIG. 6 |

OTHER PUBLICATIONS

Anon., Modern Plastics Encyclopedia, McGraw-Hill, N.Y. (1965), pp. 177-180 & 239-243.
Saunders et al., "Polyurethanes . . . " Interscience, N.Y. (1966), pp. 335, 336 & 346.

*Primary Examiner*—W. E. Hoag
*Attorney, Agent, or Firm*—Hubert E. Dubb

[57] ABSTRACT

The invention is concerned with a process for forming a unitary seal comprising a support section formed of a high modulus, i.e. rigid high impact strength plastic and a sealing section formed of an elastomeric material, the support and sealing section being directly bonded together without the use of an adhesive therebetween to form the unitary seal. The process comprises contacting a surface portion of the support section directly with a surface portion of the sealing section, under sufficient pressure to assure a pressed contact therebetween, with the sections at a temperature of 50° C.-400° C. for a time sufficient to cause bonding between the contacting surface portions to form the unitary seal.

10 Claims, 4 Drawing Figures

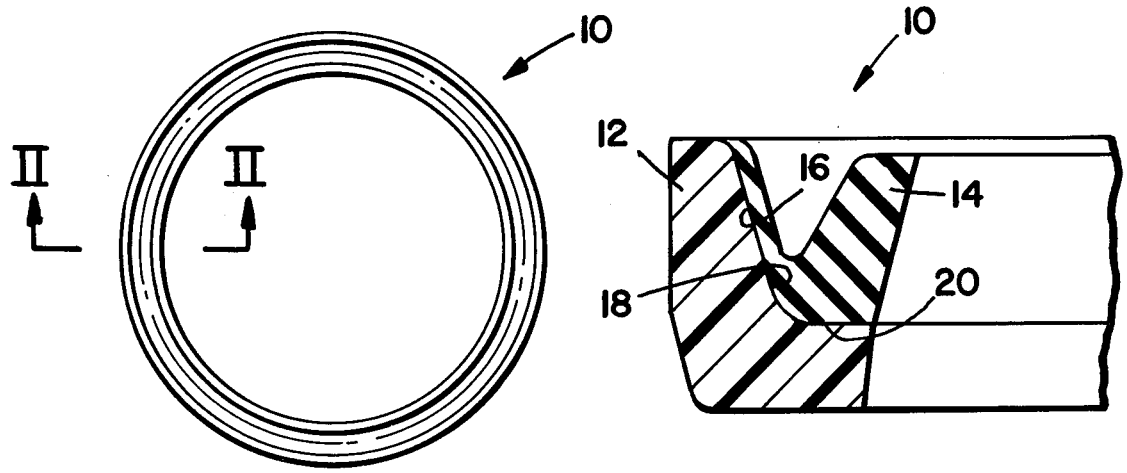
FIG_1  FIG_2
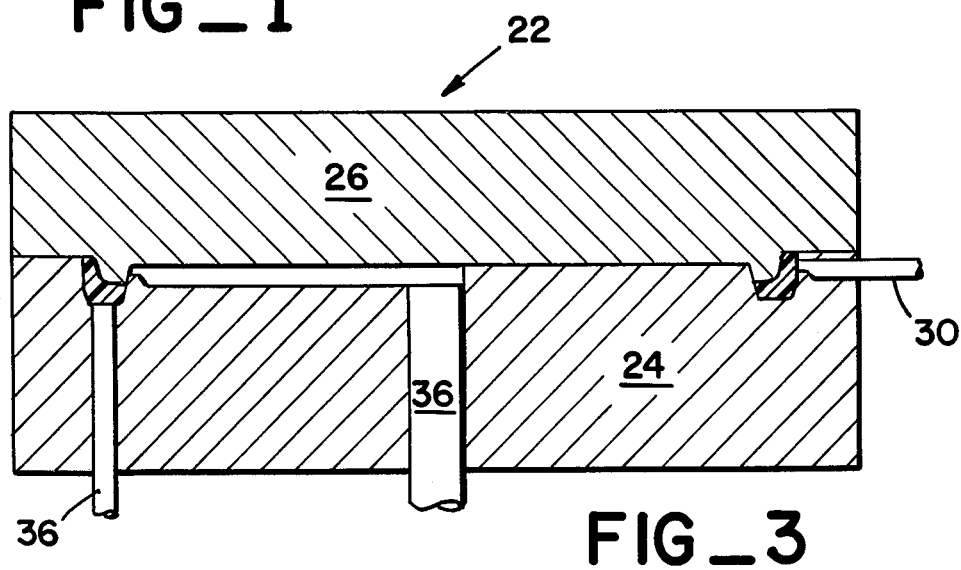
FIG_3
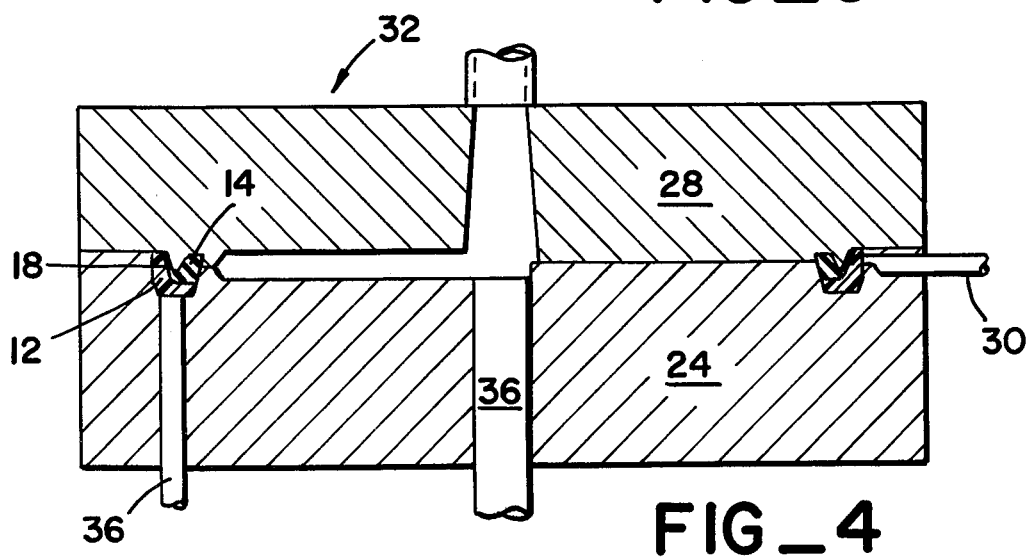
FIG_4

PROCESS FOR MAKING DUAL-MATERIAL SELF-BONDING LIP SEAL

This is a division of Ser. No. 667,769, filed Mar. 17, 1976, now U.S. Pat. No. 4,066,269, issued Jan. 3, 1978.

BACKGROUND OF THE INVENTION

1. Field of the Invention

The invention is concerned with a unitary seal formed of two distinct materials having different properties, said materials being directly bonded together without the use of an adhesive between them. Thus, an elastomeric sealing section can be made for such a seal backed by a support section of a high modulus, i.e., rigid, plastic. Such seals are tough and provide significant advantages for use in rough environments such as, for example, about shafts such as exist in loader linkage pin joints and the like.

2. Prior Art

Lip seals are, of course, quite well known to the prior art. Further, such seals have been made, as shown for example in U.S. Pat. Nos. 3,709,507 and 3,919,448, with backing members to provide support therefor. Such seals are discussed in even greater detail in an article entitled Dual-Material Molding of Radial Lip-Type Oil Seals by K. C. Rusch, R. W. Sanderson and H. VanOene published by the Ford Motor Company in the fall of 1970. It is further known, as discussed for example in U.S. Pat. No. 3,167,323, to make seals of polyurethane. Seals made of two plastic materials are further known, as shown for example in U.S. Pat. Nos. 3,765,690 and 3,771,801.

While the use of composite seals per se is old in the art, the use of such seals has presented a number of problems. First, the seals are not of unitary construction and the parts thereof can be dislodged relative to one another. This is, of course, extremely serious in heavy work environments wherein such seals are often subjected to very large forces. And, the simple gluing or adhering of a support member to a sealing member of such a seal would not adequately solve such a problem because the adhesive used might not be strong enough, formation of the composite dual material seal would require careful positioning of the parts together to avoid misalignment or the adhesive might not be completely uniformly spread between the two parts of the seal whereby leakage could occur in the non-adhered portion of the seal.

The present invention provides a unitary seal wherein the support and sealing sections thereof are directly bonded together without the use of an adhesive. This leads to a unitary seal of great toughness which can be used in rough environments such as on earth-working machines, for example, on loader linkage pin joints and the like. Further, the seal of the present invention can be formed by the methods of mass production, as described herein, thus removing the possibility of human error leading to misalignment of the support and sealing sections thereof.

SUMMARY OF THE INVENTION

The invention comprises a process for forming a unitary seal comprising a support section formed of a high modulus, i.e., rigid, plastic and a sealing section formed of an elastomeric material, said support and sealing sections being directly bonded together without the use of an adhesive therebetween to form said unitary seal. The process comprises first forming the support section and then contacting a surface portion of the support section directly with a surface portion of the sealing section under sufficient pressure to assure a pressed contact therebetween with the sections at a temperature which falls within a range from about 50° C. to about 400° C. for a time sufficient to cause bonding between said contacting surface portions to form the unitary seal.

BRIEF DESCRIPTION OF THE DRAWINGS

The invention will be better understood by reference to the figures of the drawings wherein like numbers denote the parts throughout, and wherein:

FIG. 1 illustrates, in bottom view, the unitary seal in accordance with the present invention;

FIG. 2 illustrates a view taken along the line II—II of FIG. 1;

FIG. 3 illustrates a first mold configuration ready for the injection molding of the high impact strength plastic therein; and FIG. 4 illustrates a molding configuration with a high strength plastic support section already formed therein and ready for injection of an elastomeric material thereinto to form a unitary seal in accordance with the present invention.

DETAILED DESCRIPTION OF THE PREFERRED EMBODIMENT

Turning first to FIGS. 1 and 2, there is illustrated therein a unitary seal 10 which is annular in shape in accordance with the present invention. The seal 10 includes a rigid high modulus plastic can 12 and a flexible elastomeric material lip 14. The can 12 and the lip 14 are directly bonded together along a surface, defined by the line 16, without an adhesive therebetween to form the unitary seal 10.

The rigid plastic can 12 comprises a support section for the unitary seal, and the flexible lip 14 comprises a sealing section therefor. The particular unitary seal shown at 10 is a lip seal and finds use, for example, about shafts such as are used in loader linkage pin joints and the like.

Preferably the rigid plastic can 12 comprises a polycarbonate plastic. While any polycarbonate plastic or polycarbonate resin may be used in the preferred embodiment of the invention, the commercial variety of this resin is generally produced from phosgene and bisphenol A. This preferred commercial variety of the resin has the structure $(-COOC_6H_5C(CH_3)_2C_6H_5O-)_n$ where n represents the average number of units of the above structure in a particular polycarbonate resin. More generally, a polycarbonate resin is formed from any dihydroxy compound and any carbonate diester, or by ester interchange. Such a resin is generally transparent, as well as being noncorrosive, resistant to chemicals and weather, stain resistant, nontoxic and self-extinguishing. It has low water absorption, high modulus, high impact strength, good heat resistance and dimensional stability (rigidity). A description of polycarbonate resins, useful in the practice of the present invention, may be found for example in the 1975–76 Modern Plastics Encyclopedia on pages 54 and 56.

Preferably, the polycarbonate resin will be glass-filled as by including glass fibers therein. The amount of glass fibers in the polycarbonate plastic can vary considerably and will generally fall within a range from about 5 to about 75 weight percent of the total polycarbonate plastic plus glass fiber weight. More preferably, the polycarbonate plastic is filled with from about 10 to about 60 weight percent of glass fibers based on the total weight of polycarbonate and glass fibers. More preferably still, the amount of glass fiber will fall within the range from about 20 weight percent to about 40 weight percent. It will be noted that polycarbonate resins have quite high impact strength and rigidity (high modulus). This is quite important in the present application wherein the polycarbonate resin is used as a support section for the unitary seal 10 of the present invention. Other filler materials, e.g. carbon black, graphite fibers, glass beads, mica or other mineral fillers, polyaramid fibers or the like, may be added to the polycarbonate plastic to provide opaqueness, reduce costs of the can 12 and/or introduce other properties thereto.

The flexible lip 14 very preferably comprises a polyurethane elastomer. The basic polymer unit of a polyurethane resin is formed as shown in the following equation: $R_1NCO + R_2OH = R_1NHCOOR_2$ wherein $R_1$ and $R_2$ comprise organic groups which may include hydroxyl groups as a part thereof. If $R_1$ has an additional NCO group and $R_2$ has a second OH group, chain growth can occur. Cross linking can take place if $R_2$ has three or more OH groups. Polyurethane resins are often made through use of toluene diisocyanate. Often an 80:20 mixture of the 2, 4- and 2, 6- isomers are used. Diphenylmethane -4, 4'- diisocyanate is also a widely used diisocyanate for forming polyurethane resins. The hydroxyl groups which are incorporated into the resins often come from polyethers, especially polyoxypropylene. A detailed description of the polyurethane elastomers which are useful in the formation of unitary seals in the present invention may be found in the 1975-76 Modern Plastics Encyclopedia at pages 84 and 85 thereof.

It has been unexpectedly found that when the support section or cap 12 is of rigid polycarbonate plastic and the flexible lip 14 is a polyurethane elastomer, one can obtain a direct bonding together of these structures without the use of an adhesive therebetween whereby a unitary seal is formed which is strong enough to withstand the stresses to which such a seal is exposed. The production of a direct bond of such strength is quite unexpected because of the different structures of the polymers which are bonded together. It has been found that this bonding together can be carried out under only the influence of heat and sufficient pressure to assure a pressed contact between the polycarbonate can 12 and the flexible polyurethane lip 14.

Referring now most particularly to FIGS. 3 and 4, there is illustrated therein a preferred method for forming the unitary seals 10 of the present invention. Briefly, the process comprises contacting a surface portion 18 of the rigid plastic can 12 with a surface portion 20 of the flexible lip 14. The two surface portions are contacted under sufficient pressure to assure a pressed contact therebetween. Generally, the pressure of contact will fall within a range from about 14 MPa to about 207 MPa. More preferably, the pressure will fall within the range from about 17 MPa to about 34 MPa. Particularly good results have been found with a pressure of approximately 28 MPa.

The contacting is generally at a temperature which falls within a range from about 50° C. to about 400° C. Preferably, the temperature of the contacting falls within the range from about 50° C. to about 200° C.

The contacting is continued at the above temperature and under the above pressed contact conditions for a time sufficient to cause bonding between the contacting surface portions 18 and 20. Generally, the contacting time is at least about 0.5 seconds. Preferably, the contacting time falls within a range from about 0.5 seconds to about 20 seconds.

The process of the present invention preferably includes an added step after the contacting in order to fully complete the bonding of the polycarbonate plastic to the polyurethane elastomer. The added step comprises maintaining the unitary seal at a temperature which falls within a range from about 50° C. to about 200° C. for a time sufficient to post-cure and thereby strengthen the bond between the surface portions 18 and 20. Generally, the post-curing time will be at least about two hours and more generally will fall within a range from about four hours to about forty-eight hours. More preferably, the post-curing time will fall within a range from about sixteen hours to about twenty-four hours, and the post-curing temperature will fall within a range from about 90° C. to about 125° C.

The process of the present invention preferably proceeds via an injection molding procedure. In particular, the process preferably includes, as an added step prior to the contacting, forming the support section by injecting polycarbonate plastic heated to a temperature which falls within a range from about 200° C. to about 400° C. into a first mold and confining the polycarbonate within the first mold for a time sufficient to allow solidification of the polycarbonate plastic. Preferably, the temperature during the forming of the support section falls within a range from about 260° C. to about 315° C. and the support section forming time falls within a range from about one second to about thirty seconds.

It is further preferred that the contacting includes forming the sealing section or lip 14 by injecting the polyurethane elastomer heated to a temperature which falls within the range from about 150° C. to about 350° C., and more preferably from about 175° C. to about 225° C. into a second mold having the solidified polycarbonate plastic therein defining a part thereof, said part corresponding to the surface portion 18 of the support section or can 12. The polyurethane elastomer is then confined within the second mold for a time sufficient to allow solidification of the polyurethane elastomer. Generally, the forming temperature for the sealing section, i.e. the polyurethane lip 14, will preferably fall within a range from about 175° C. to about 225° C. and the time needed for forming the lip 14 will preferably fall within a range from about one second to about thirty seconds. Generally, the unitary seal is removed from the molding apparatus prior to post-curing thereof.

A particularly useful apparatus for carrying out the above process is shown schematically in FIGS. 3 and 4. In FIG. 3 it will be seen that a first mold 22 is defined by a first mold half 24 and a second mold half 26. With the mold halves 24, 26 in the positions shown in FIG. 3, the high modulus (rigid) plastic is injection-molded via a conduit 30. In this way, the first mold 22 is filled with the high modulus plastic. In the preferred embodiment of the invention, this would comprise the polycarbonate plastic and the pressure of injection and the temperature and time of formation of the can 12 from the polycarbonate plastic would be as described above.

After the polycarbonate plastic has hardened, the mold half 24 is indexed or moved away from the first mold half 26 into engagement with a third mold half 28 and assumes the position shown in FIG. 4. As will be seen in FIG. 4, a second mold 32 is formed by the surface portion 18 of the can 12 and by the portions of the first mold half 24 and the third mold half 28. The polyurethane elastomer is now inserted into the second mold 32 via a second conduit 34. The times and temperatures of insertion of the polyurethane elastomer are as set out above for formation of the unitary seals 10. A second conduit 34 is generally used because the first conduit 30 would generally be blocked by a runner or runners extending from the can 12. The second mold 32, or more particularly the first mold half 24 and the third mold half 28, are generally maintained at a temperature which falls within a range from about 40° C. to about 175° C. during injection of the polyurethane elastomer. This is important to assure the formation of a direct bond between the polyurethane elastomer and the polycarbonate plastic. Pressure is as set out above to ensure adequate polyurethane to polycarbonate bonding.

After formation of the unitary seal 10, it is removed from the second mold 32 by moving the third mold half 28 away from the first mold half 24 and then advancing the ejector pins 36 in a manner usual in the art. Conventional cooling and/or heating means can be included which cool and/or heat the first mold half 24, the second mold half 26 and the third mold half 28 in order to provide the desired temperature conditions. Generally, hydraulic ram means, not illustrated, are used to maintain the first mold half 24 first against the second mold half 26 and subsequently against the third mold half 28 with sufficient pressure to assure the proper formation of an injection molded part therebetween.

After injection molding of the unitary seal 10, it is generally post-cured, as previously mentioned, for generally from four to forty-eight hours, and more usually from eight to sixteen hours, at a temperature within the ranges set out previously to strengthen the polyurethane to polycarbonate bond.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A process for the injection molding of a unitary seal having a support section formed of a high modulus rigid polycarbonate plastic and a sealing section formed of a polyurethane elastomeric material, consisting essentially of:

injecting sufficient polycarbonate, heated on a temperature from about 200° C. to about 400° C., into a first injection mold to fill said first injection mold;

retaining said polycarbonate in said first injection mold for a time sufficient to allow solidification of said polycarbonate and formation thereof into said support section;

forming a second injection mold with a surface portion of said support section defining a portion of the surface of said second injection mold;

injecting polyurethane elastomer, heated to a temperature from about 150° C. to about 300° C., into said second injection mold in a sufficient amount to fill said second injection mold;

confining said polyurethane elastomer in said second injection mold for a time sufficient to allow solidification thereof into said sealing section; and retaining said second mold intact under sufficient pressure to retain a pressed contact between said surface portion of said support section and a mating surface portion of said sealing section, while maintaining said sections at a temperature from about 50° C. to about 400° C. for a time sufficient to cause a bonding between said contacting surface portions to form said unitary seal.

2. A process as in claim 1, wherein said first injection mold includes a first mold portion and a second mold portion, and said forming step includes maintaining said support section in contact with said first mold portion while separating said second mold portion from both said first mold portion and said support section and then contacting a third mold portion with said first mold portion to form said second injection mold.

3. A process as in claim 1, wherein said pressed contacting time is at least about 0.5 seconds and including as an added step after said pressed contacting maintaining said unitary seal at a temperature which falls within a range from about 50° C. to about 200° C. for a time sufficient to post-cure and thereby strengthen the bond between the surface portions.

4. A process as in claim 3, wherein said contacting time falls within a range from about 0.5 seconds to about 30 seconds and said post-curing time is at least about two hours.

5. A process as in claim 4, wherein said post-curing time falls within a range from about four hours to about forty-eight hours.

6. A process as in claim 5, wherein the polyurethane elastomer is injected into said second mold at a pressure which falls within a range of about 14 MPa to about 207 MPa.

7. A process as in claim 6, wherein said sealing section forming temperature falls within a range from about 175° C. to about 225° C., said sealing section forming time falls within a range from about 1 second to about 30 seconds, said support section forming temperature falls within a range from about 260° C. to about 315° C., and said support section forming time falls within a range from about 1 second to about 30 seconds and wherein said second mold is maintained at a temperature which falls within a range from about 40° C. to about 175° C. during injection of said polyurethane elastomer.

8. A process as in claim 7, wherein said post-curing is at a temperature which falls within a range from about 90° C. to about 125° C. and for a time which falls within a range from about sixteen hours to about twenty-four hours.

9. A process as in claim 8, wherein the pressure of polyurethane elastomer injection is within a range from about 17 MPa to about 34 MPa.

10. A process as in claim 9, including removing the unitary seal from the second mold prior to post-curing thereof.

* * * * *